Dec. 23, 1941.    W. L. MARTIN    2,266,884
RAZOR HEAD
Filed Jan. 11, 1938    2 Sheets-Sheet 1

INVENTOR
WENDELL L. MARTIN
BY
ATTORNEY

Dec. 23, 1941.            W. L. MARTIN            2,266,884
                           RAZOR HEAD
                      Filed Jan. 11, 1938            2 Sheets-Sheet 2

INVENTOR
WENDELL L. MARTIN
BY
ATTORNEY

Patented Dec. 23, 1941

2,266,884

UNITED STATES PATENT OFFICE 2,266,884

RAZOR HEAD

Wendell L. Martin, Cleveland Heights, Ohio, assignor to The Martin Brothers Electric Company, Cleveland, Ohio, a corporation of Ohio Application January 11, 1938, Serial No. 184,464

4 Claims. (Cl. 30—43)

This invention relates broadly to dry shavers, but more particularly to an improved shear plate or guard that rests against the skin and has a reciprocatory cutter operatively engaging its under side for cutting or shearing hairs.

One object of this invention is to produce an improved shear plate for dry shavers.

Another object of this invention is to produce a shear plate having a plurality of cutting edges formed by minute slots extending transversally of the plate, the slots being parallel to each other but offset laterally in a manner causing a straight line extending across the plate to be intersected by at least one slot, thereby allowing a surface equal in width to the length of the plate to be shaved during each stroke of the razor.

Another object of this invention is to produce a shear plate designed and constructed for cooperation with a reciprocatory cutter in a manner facilitating admission of the hair into the slots of the shear plate.

Another object of this invention is to produce a shear plate provided with a plurality of parallel cutting teeth each formed with serrated cutting edges preventing deflection of the hair relative to the shear plate, and consequently enabling a cleaner or closer shave.

Still another object of this invention is to provide the teeth of a shear plate for dry shavers with raised end portions or spots engageable with the skin and causing it, upon slight pressure of the shear plate against the skin, to bulge or penetrate partway into the slots of the plate, thereby causing the skin to be positioned closer to the cutting edges of the teeth while preventing it to extend beyond the underside of the plate.

Still a further object of this invention is to produce an improved shear plate for dry shavers, which is relatively inexpensive to manufacture and which may be pressed against the skin without danger of caving or flexing.

Figure 3:
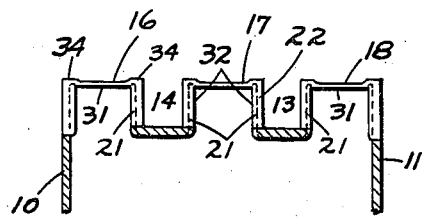
Fig. 3 is a cross sectional view taken in a plane indicated by line 3—3 in Fig. 1.
Figure 7:
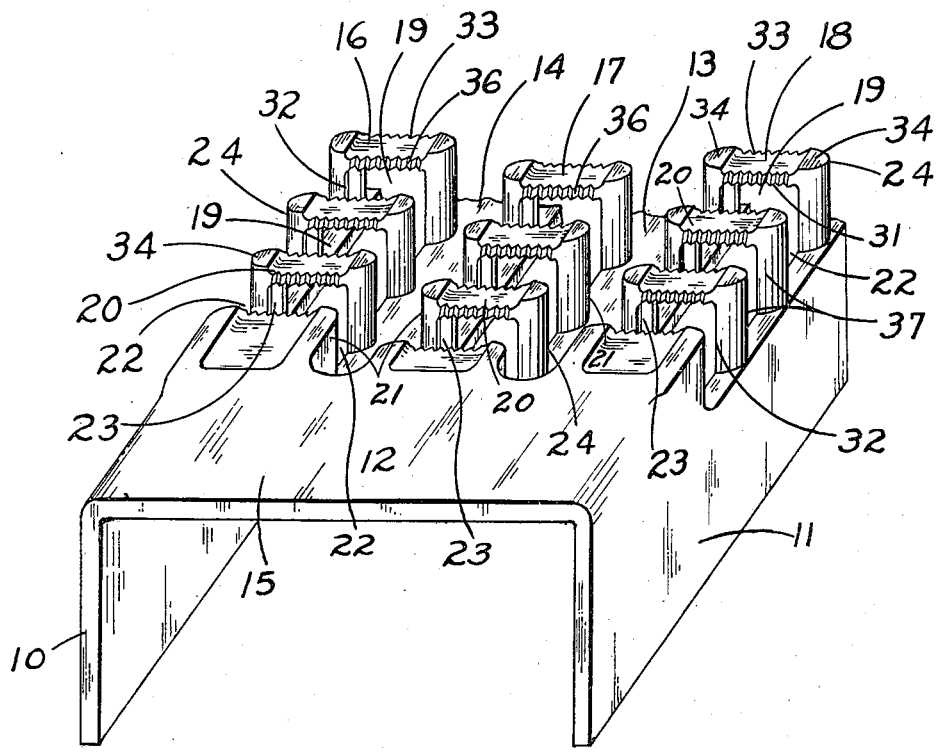
Fig. 7 is an enlarged perspective view of the shear plate shown in Fig. 1.

Referring to the drawings, there is shown an improved shear plate of substantially channel-shaped cross section including two parallel side walls 10 and 11, and a cross or upper wall 12. In practice, the height of the side walls is about a quarter of an inch, while the length thereof, which is equivalent to the length of the shear plate, is about an inch and a half. Provided in the cross wall 12, there are two parallel longitudinally extending grooves or furrows 13 and 14 of substantially U-shaped cross-section with the bottom wall thereof located between the side walls 10 and 11. The width and depth of these grooves are about one-sixteenth of an inch, while each longitudinal end thereof falls short of the corresponding end of the cross wall 12, leaving a flat reinforcing land 15 for each end of the cross wall. As a result of the grooves 13 and 14, the cross wall 12, or more particularly the external surface thereof, instead of extending uninterrupted from one to the other of its longitudinal marginal edges is actually formed, as clearly shown in Figs. 3 and 7, of three laterally spaced longitudinally extending bridges 16, 17 and 18 of substantially channel-shaped cross section and of width equal to about three-thirty seconds of an inch. These so-called bridges have side walls 21 parallel to the side walls 10 and 11 of the shear plate, the upper portion of the side wall 10 forming one of the side walls for the bridge 16 while the similar portion of the side wall 11 forms one side wall for the bridge 18.

Figure 2:
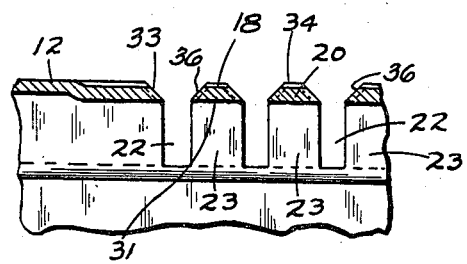
Fig. 2 is an enlarged longitudinal sectional view taken in a plane indicated by line 2—2 in Fig. 1.

Extending through the cross wall of each bridge, 16, 17 and 18, there is a plurality of longitudinally and equally spaced open ended slots 19, each parallel to one another and disposed transversally of the bridge preferably at right angles with the side walls thereof. Between each adjacent slot 19, the normal cross wall of each bridge forms a tooth 20. As shown in Fig. 2, the side walls 21 of the bridges 16, 17 and 18, which side walls includes the upper portion of the side walls 10 and 11 of the shear plate, are also provided with slots 22 extending therethrough in alignment with and actually forming a continuation of the horizontal slots 19. The land left between each adjacent vertical slot 22 forms a vertical tooth 23. In practice, the slots 19 and 22 are preferably formed with a V-shaped tool, resulting in the teeth 20 and 23 having inclined side walls 36 and 37 respectively. The teeth 23 are actually vertical continuations of the horizontal teeth 20, which continuations, due to the V-shaped tool used in forming the slots 19 and 22, result in pointed ends 24 for the horizontal teeth 20.

Figure 1:
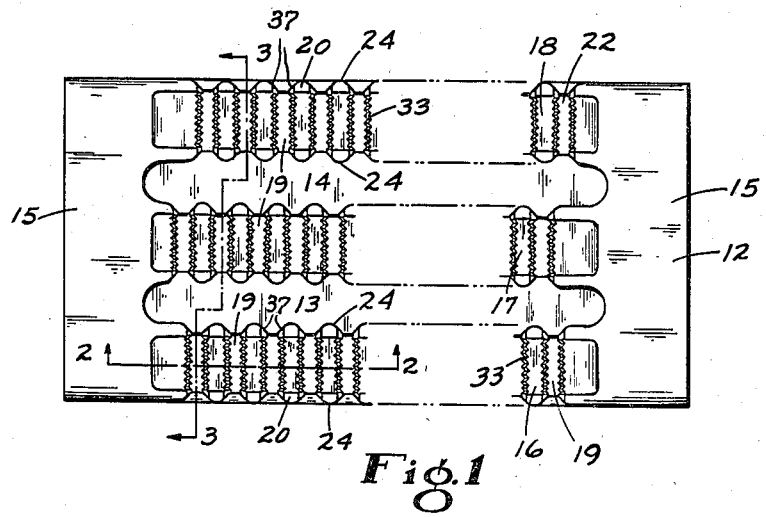
Fig. 1 is an enlarged plan view of a shear plate embodying the invention.

As now understood, each bridge 16, 17 and 18 is formed with V-shaped longitudinally spaced slots extending transversally thereof. In practice, the slots of one bridge are somewhat offset or staggered relative to the corresponding slots of the other bridges, in such a manner that the longitudinal center axis of corresponding slots within the three bridges can be represented by the zigzag line 3—3 in Fig. 1. The longitudinal space between adjacent slots of one bridge is about thirty thousands of an inch, and the offset between the corresponding slots of the adjacent bridges about ten thousands of an inch and of course twenty thousands of an inch between corresponding slots of the extreme bridges 16 and 18. From the foregoing explanation, it will be understood that due to the provision of the longitudinally extending grooves 13 and 14, it is possible to laterally stagger the slots of the bridges 16, 17 and 18.

Figure 4:
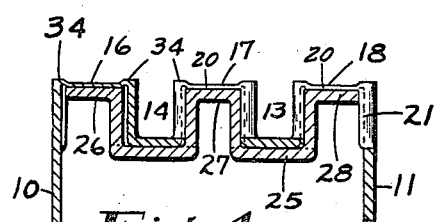
Fig. 4 is a view corresponding to Fig. 3, illustrating the improved shear plate together with the cutter in operative position.
Figure 5:
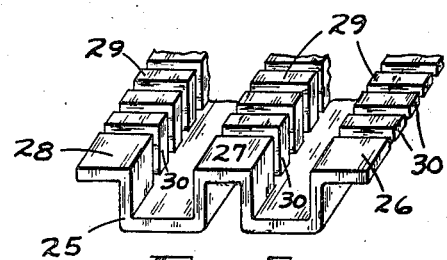
Fig. 5 is a perspective view of the cutter shown in cross section in Fig. 4.
Figure 6:
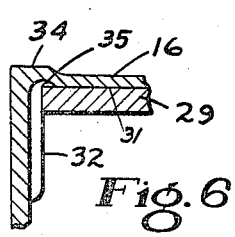
Fig. 6 is an enlarged portion of Fig. 4 showing details of construction.

To clearly illustrate the application of the shear plate, there is shown in Fig. 4 an enlarged cross sectional view of the shear plate and a cutter 25 mounted in operative engagement. In Fig. 5, the cutter 25 is shown in perspective illustrating three bridges 26, 27 and 28 closely fitting within the corresponding bridges 16, 17 and 18 of the shear plate as shown in Fig. 4. The bridges of the cutter are also formed with flat horizontal teeth 29 and vertical teeth 30 cooperating with the teeth 20 and 23 respectively of the shear plate for effecting the shearing or cutting operation. If it is desired, the three bridges 26, 27 and 28 of the cutter may be made somewhat narrower than the corresponding inner width of the bridges of the shear plate, thereby allowing the cutter to engage only the inner horizontal wall of the shear plate to cooperate with the horizontal teeth 20 for effecting the shearing action. In this instance, the vertical teeth 23 of the shear plate being now spaced from the corresponding vertical teeth 30 of the cutter 25, will act as a comb for directing the hairs to be sheared between the teeth 20 of the shear plate. In practice, the cutter 25 is reciprocated relative to the shear plate by any suitable device such as an electric motor or the like, thereby causing its teeth 29 and 30 to move relative to the corresponding teeth 20 and 23 of the shear plate and overlap the same for shearing the hairs located therebetween. To assure adequate engagement of the upper surface of the cutter with the underside of the shear plate, the cutter is preferably urged into engagement with the shear plate by any suitable means such as a compression spring or the like.

The inclined side walls 36 and 37 of the teeth 20 and 23 forming with the perfectly flat inner horizontal walls 31 and vertical walls 32 of the bridges 16, 17 and 18, sharp cutting edges. As a further improvement, the side walls of the teeth 20 are preferably corrugated or serrated by the formation thereon of vertical parallel minute V-shaped grooves 33. In depth, the grooves or serrations 33 are only a few thousandths of an inch, while in length they are equal to the thickness of the teeth 20. By providing the side walls of the teeth 20 with serrations, it will be understood that the cutting edges thereof are thus serrated, thereby preventing movement of the hairs relative to the shearing plate during reciprocatory movement of the cutter cooperating with the shearing plate.

As clearly shown in the drawings, the top of each horizontal tooth 20 instead of being perfectly flat, is provided with two raised spots 34 forming the ends of each tooth. These spots extend about ten to twelve thousandths of an inch above the normal flat surface of the teeth and constitute skin engaging spots depressing the skin when the shearing plate is gently pressed against the skin. In other words, each horizontal slot 19 is really bordered by four skin engaging spots 34 between which the skin is stretched by slightly pressing the shearing plate against the skin. This spotted engagement of the skin by the shear plate above each slot 19, will cause the skin to bulge or penetrate into the slot while being taut, thereby causing the skin to be positioned very close to the shearing edges of the teeth while preventing it to extend beyond the underside of the shearing plate. The skin thus stretched between the spots 34 will also cause the extension of the hairs beyond the normal surface of the skin and their penetration into the slots 19 to be sheared by the cutter. In practice, the shear plate is preferably made of thin metal having a uniform thickness, thereby resulting in the inner wall 35 of the raised spots 34 to be also raised from the normal undersides 31 of the teeth 20 engaged by the flat teeth 29 of the cutter 25, thereby causing the raised ends of the teeth while moved over the skin, to act as a comb directing the hairs into the slots to be sheared by the cutter. Since the raised ends of the teeth are not engaged by the cutter, but are actually in constant spaced relation therewith, lateral admission of the hairs into the slots 19 through the open ends of the slots will take place without interference from the cutter.

I claim:

1. A shearing implement comprising a shearing plate formed with alternate slots and teeth extending laterally thereof, said slots being open at least at one end and of a width enabling admission of the hair between said teeth, a flat slotted cutter reciprocable longitudinally of said plate and bearing against the underside thereof, the underside end portions of said teeth adjacent the open ends of said slots being raised above the plane of the cutter teeth to facilitate the lateral admission of the hair into said slots through the open ends thereof.

2. A shaving implement comprising a shearing plate of at least one channel-shaped cross section, a plurality of longitudinally spaced laterally extending slots through the cross wall of said plate extending into at least one of the side walls thereof, the space between two adjacent slots forming a cutting tooth, a flat slotted cutter reciprocable longitudinally of said plate and bearing against the underside of the cross wall thereof, the underside end portion of each tooth adjacent the portion of the slots extending into said side wall being raised above the plane of the cutter teeth to facilitate admission of the hair into said slots through the open ends thereof.

3. A shearing implement comprising a shearing plate including at least one substantially rectangular skin contacting wall, alternate slots and teeth extending laterally of said wall, said slots extending through at least one of the longitudinal edges of said wall to provide at least one unobstructed open end for each slot, a flat slotted cutter reciprocable longitudinally of said plate and bearing against the underside of said wall, the underside end portion of each tooth adjacent the longitudinal edge of said wall through which extend said slots being raised above the plane of the cutter teeth.

4. A shearing implement comprising a shearing plate provided with alternate slots and teeth extending laterally of said plate, each slot being formed with at least one unobstructed open end enabling admission of the hair thereinto during translation of the plate over the skin, a flat slotted cutter operatively engaging the under side of said plate, the underside end portion of said teeth adjacent the open ends of said slots being raised above the plane of the cutter teeth to facilitate admission of the hair into said slots through the open ends thereof.

WENDELL L. MARTIN.